United States Patent [19]

Sakurai

[11] Patent Number: 4,670,353

[45] Date of Patent: Jun. 2, 1987

[54] MAGNETOOPTICAL RECORDING MEDIUM

[75] Inventor: Yoshifumi Sakurai, Minoo, Japan

[73] Assignee: Canon Kabushiki Kaisha, Tokyo, Japan

[21] Appl. No.: 783,052

[22] Filed: Oct. 1, 1985

Related U.S. Application Data

[63] Continuation of Ser. No. 693,330, Jan. 22, 1985, abandoned, which is a continuation of Ser. No. 475,329, Mar. 14, 1983, abandoned.

[30] Foreign Application Priority Data

Mar. 17, 1982 [JP] Japan .................................. 57-42411
Mar. 1, 1983 [JP] Japan .................................. 58-33972
Mar. 1, 1983 [JP] Japan .................................. 58-33973

[51] Int. Cl.$^4$ ............................................. B21C 37/00
[52] U.S. Cl. ................................... 428/606; 148/304; 148/311; 148/313; 148/403; 420/58; 420/83; 420/581
[58] Field of Search ................... 148/31.57, 403, 31.55; 420/582, 416, 435, 581; 365/113, 122; 75/123 E, 123 K; 428/606; 360/131, 135

[56] References Cited

U.S. PATENT DOCUMENTS 4,126,494 11/1978 Imamura et al. ..................... 148/403
4,152,486 5/1979 Imamura et al. .................. 75/12 E

FOREIGN PATENT DOCUMENTS 2713190 10/1978 Fed. Rep. of Germany ... 148/31.55

Primary Examiner—John P. Sheehan
Attorney, Agent, or Firm—Fitzpatrick, Cella, Harper & Scinto

[57] ABSTRACT

A magnetooptical recording medium comprises a ternary amorphous magnetic alloy of Tb-Fe-Co.

15 Claims, 4 Drawing Figures

MAGNETOOPTICAL RECORDING MEDIUM

This application is a continuation of application Ser. No. 693,330 filed Jan. 22, 1985, now abandoned, which in turn is a continuation of application Ser. No. 475,329 filed Mar. 14, 1983, now abandoned.

BACKGROUND OF THE INVENTION

1. Field of the Invention

This invention relates to a magnetooptical recording medium which may be used for optomagnetic memory, magnetic recording and display elements, and more particularly, to a magnetic thin film recording medium capable of being read by the magnetooptical effect.

2. Description of the Prior Art

Heretofore, there have been known various magnetooptical recording medium, for example, polycrystalline thin films such as MnBi, MnCuBi and the like, amorphous thin films such as GdCo, GdFe, TbFe, DyFe, GdTbFe, TbDyFe and the like, and single crystalline thin films such as GIG and the like.

Among these thin films, the amorphous thin films have been recently regarded as excellent magnetooptical recording mediums since the thin films of a large area can be produced at about room temperature, signals can be written with a small light-thermal energy at a good writing efficiency, and the written signals can be read out at a good S/N ratio at a high read-out efficiency.

However, these amorphous thin films suffer from various drawbacks. For example, GdFe has a small coercive force and the recorded information is not stable.

In the case of GdFe or GdCo, the writing is effected utilizing the magnetic compensation temperature and therefore, there is a drawback that the film composition should be strictly controlled upon forming the film so as to make the writing efficiency uniform.

In the case of TbFe, DyFe or TbDyFe, a Curie temperature (Tc) writing is effected, and therefore, it is not necessary to control so strictly the film composition, but there is a drawback that the Curie temperature is as low as 100° C. or less so that a light having a strong power can not be used upon reading the signal.

Further, it is easy to produce a medium of a large area of the amorphous thin film, but in general, the performance index corresponding to reading efficiency for reading the signal is small as compared with MnBi polycrystalline thin films and GIG signal crystalline thin films and there is not obtained a sufficient S/N ratio.

British Patent Publication No, 2,071,696 proposes amorphous ternary alloy thin films composed of Gd-Tb-Fe which have a large magnetooptical constant of amorphous thin films such as the angle of Kerr rotation and the like to effect reading at a good S/N ratio.

The angle of Kerr rotation and Curie temperature of conventional magnetooptical thin films are shown in Table 1 below.

TABLE 1

| Material | Angle of Kerr rotation (degree) | Curie temperature (°C.) |
| --- | --- | --- |
| DyFe | 0.12 | 62 |
| TbFe | 0.18 | 91 |
| GdFe | 0.24 | Compensation[*1] temperature (T comp.) |
| GdCo | 0.2 | Compensation[*1] temperature (T comp.) |
| TbDyFe | 0.20 | 75 |
| GdDyFe | 0.24 | 120 |
| GdTbFe | 0.27 | 150 |

(measuring wavelength 6328Å)

[*1]Compensation temperature writing

The angle of Kerr rotation is defined as shown below. A linearly polarized light incident on a magnetooptical thin film is reflected as an elliptically polarized light. The angle of Kerr rotation is the angle formed by the polarized plane of the incident light and the plane formed with and containing major axes of the resulting elliptical polarized light.

As is clear from Table 1, the largest angle of Kerr rotation is 0.27 degree for GdTbFe. For reading at a stable S/N ratio, at least 0.2 degree or more of the angle of Kerr rotation is desirable. It goes without saying that the larger magnetooptical constants such as the angle of Kerr rotation and the like, the better the S/N ratio upon reading.

The lower the Curie temperature, the higher the efficiency of writing, but the signal written in is disturbed by the ambient temperature and the read-out light at a low Curie point. Therefore, the magnetic transformation temperature is preferably about 100° C.-200° C. taking the practical use situation into consideration.

On the other hand, the alloys in Table 1 show ferrimagnetism so that there are compensation compositions. The coercive force is very large near the compensation composition region.

In general, the angle of Kerr rotation effecting the S/N ratio and the coercive force influencing the stability of recorded magnetic domains change independently from each other with respect to the alloy composition, and therefore, an alloy composition having a large angle of Kerr rotation does not always exhibit a large enough coercive force.

Since an alloy composition having a very large coercive force needs a very large magnetic field for magnetization or demagnetization when it is used for a recording medium, such an alloy composition is not desirable from the practical point of view even if the angle of Kerr rotation is large.

SUMMARY OF THE INVENTION

An object of the present invention is to provide a magnetooptical recording medium having sufficiently large magnetooptical constants and capable of reading at a good S/N ratio.

Another object of the present invention is to provide a magnetooptical recording medium having high thermal stability.

A further object of the present invention is to provide a magnetooptical medium which can be produced in a form of thin film.

Still another object of the present invention is to provide a magnetooptical medium having a coercive force which is easy for handling.

According to the present invention, there is provided a magnetooptical recording medium which comprises a ternary amorphous magnetic alloy of Tb-Fe-Co.

DESCRIPTION OF THE PREFERRED EMBODIMENTS

Figure 1:
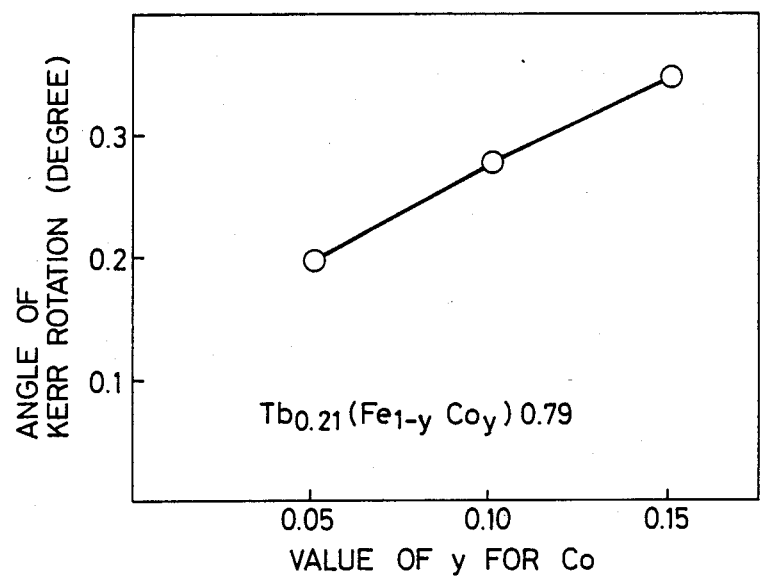
FIG. 1 shows a relation between cobalt content and angle of Kerr rotation of the composition of $Tb_{0.21}(Fe_{1-y}Co_y)_{0.79}$ according to the present invention.
Figure 2:
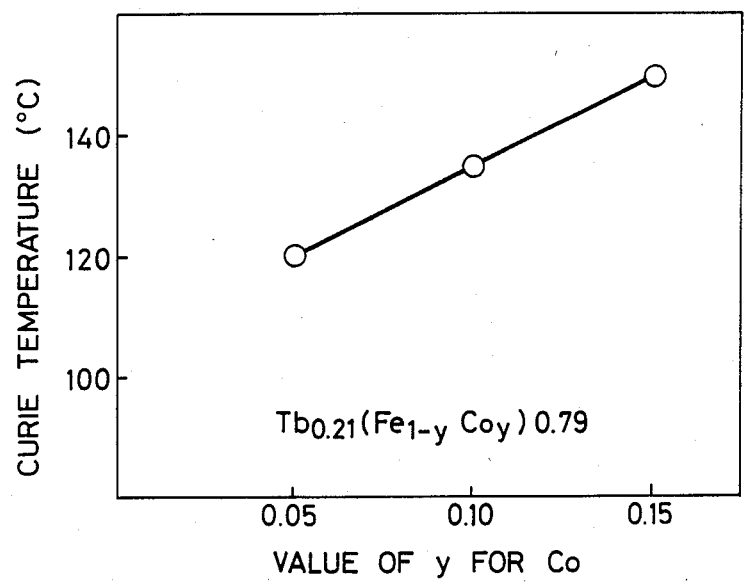
FIG. 2 shows a relation between cobalt content and Curie temperature of the composition of $Tb_{0.21}(Fe_{1-y}Co_y)_{0.79}$ according to the present invention.

According to a magnetooptical recording medium of the present invention, a medium having excellent magnetooptical constants is obtained depending on a novel composition of Tb-Fe-Co which forms an amorphous magnetooptical medium in combination therewith.

As clearly shown in the Examples (infra), an angle of Kerr rotation is much larger than the angle of Kerr rotation for GdTbFe having 0.27 degree which is the largest among the compositions which have been previously known.

The magnetooptical recording medium of ternary amorphous alloy of Tb-Fe-Co according to the present invention should possess sufficient anisotropy in order to dispose an axis of the easy magnetization thereof perpendicular to a film surface.

Accordingly, the film is required to be composed primarily of an amorphous material.

In general, the film may be prepared on a substrate which is maintained in a vicinity of, or below room temperature, according to the processes such as sputtering, vacuum vapor deposition and the like.

A magnetooptical recording medium of a ternary amorphous magnetic alloy according to the present invention preferably has a composition represented by the formula:

$$Tb_y(Fe_{1-x}Co_x)_{1-y}$$

where $$\begin{cases} 0.1 \leq y \leq 0.16 + \frac{4}{37.5}x & \text{when } 0 < x < 0.375 \\ 0.1 \leq y \leq 0.2 - 0.064(x - 0.375) & \text{when } 0.375 < x < 1 \end{cases}$$

or $$\begin{cases} 0.2 + \frac{x}{3} \leq y \leq 0.4 & \text{when } 0 < x \leq 0.3 \\ 0.3 \leq y \leq 0.4 & \text{when } 0.3 < x < 1 \end{cases}$$

In order to provide a sufficient anisotropy for the recording medium, the composition of Tb, Fe and Co is preferably $$0.6 \leq (1-y) \leq 0.9$$

in terms of a general formula:

$$Tb_y(Fe_{1-x}Co_x)_{1-y}$$

Furthermore, in order to provide a thermal stability for the recording medium, the composition is also preferably $$0.01 \leq x < 1.0$$

That is, a Curie temperature of the composition may be 100° C. or higher and a thermal stability thereof may be improved, when a Co atom is present in a composition in an amount of 0.01 atom based on a total amount (1.0 atom) of Fe and Co.

It is also preferable in the magnetooptical recording medium of the present invention that the Co content is 30 atomic %–70 atomic % based on the total amount of Co and Fe atoms in the ternary amorphous magnetic alloy of Tb-Fe-Co in order to obtain a large magnetooptical constant.

On the other hand, in order to dispose a direction of easy magnetization perpendicular to a film surface, a film thickness is preferably 100 Å or more.

The present invention is illustrated by the following examples.

EXAMPLE 1

In a high frequency sputtering apparatus, a sheet glass of 25 mm in thickness was used as a substrate, and a material, $Tb_{0.21}(Fe_{0.95}Co_{0.05})_{0.79}$, prepared by an arc-melt process was used as a target. In the apparatus the substrate and the target were disposed apart at a distance of 50 mm, and the apparatus was evacuated to a pressure of $3 \times 10^{-7}$ Torr or below. Ar gas of 99.999% in purity was introduced into the apparatus to $5 \times 10^{-4}$ Torr and subsequently the pressure of Ar gas in the apparatus was adjusted to $5 \times 10^{-2}$ Torr by operating a main valve on the evacuation line. A film was formed on the substrate by applying a power of 2 W/cm² to the target from a high frequency power source.

The film thus formed of 1500 Å in thickness possesses an axis of easy magnetization perpendicular to the film surface, an amorphous state proved by X-ray diffraction, and angle of Kerr rotation of 0.2 degree. The angle of Kerr rotation is larger than that of $Tb_{0.21}Fe_{0.79}$ having 0.18 degree.

The Curie temperature of $Tb_{0.21}(Fe_{0.95}Co_{0.05})_{0.79}$ is 120° C., and is higher than the Curie temperature of $Tb_{0.21}(Fe_{0.95}Co_{0.05})_{0.79}$ having 91° C., by 29° C. The substitution of Co for Fe of 5 atomic % resulted in improvement in both the angle of Kerr rotation and the Curie temperature.

EXAMPLE 2

The film was prepared by repeating Example 1 except that a composition of the target material for sputtering was $Tb_{0.21}(Fe_{0.90}Co_{0.10})_{0.79}$. The resulting film had an axis of easy magnetization perpendicular to the film surface, an amorphous state proved by X-ray diffraction, and an angle of Kerr rotation of 0.28 degree and a Curie temperature of 135° C.

The substitution of Co for Fe of 10 atomic % resulted in improvement in the angle of Kerr rotation and the Curie temperature, that is, by 0.1 degree in the former and by 44° C. in the latter in comparison with those of $Tb_{0.21}Fe_{0.79}$.

EXAMPLE 3

The procedures of Example 1 were repeated except that the composition of the target material for sputtering was $Tb_{0.21}(Fe_{0.85}Co_{0.15})_{0.79}$. The resulting film was amorphous, had an axis of easy magnetization perpendicular to the film surface, and had the angle of Kerr rotation of 0.35 degree and the Curie temperature of 150° C.

The substitution of Co for Fe of 15 atomic % resulted in improvement in the angle of Kerr rotation and the Curie temperature, that is, by 0.17 degree in the former and by 59° C. in the latter in comparison with those of $Tb_{0.21}Fe_{0.79}$.

Figure 3:
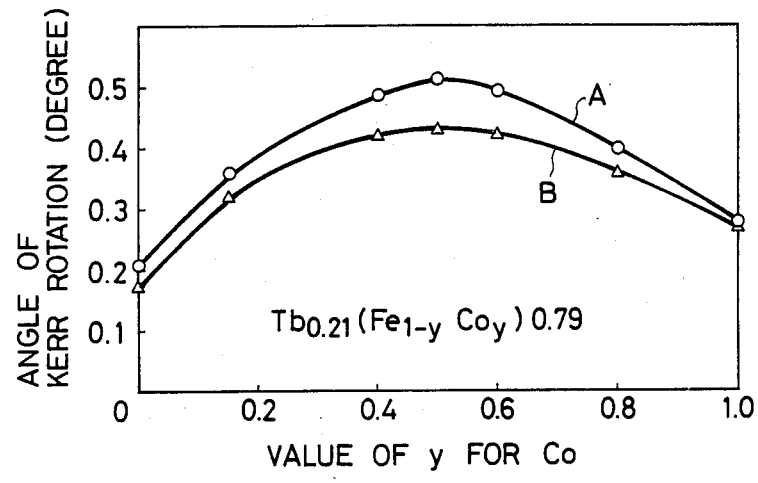
FIG. 3 shows a relation between cobalt content and angle of Kerr rotation of the composition of $Tb_{0.21}(Fe_{1-y}Co_y)_{0.79}$ according to the present invention, wherein the cobalt content is further changed from 0 to 1.0 atom based on the total amount of (1.0 atom) of Co and Fe.

FIG. 3 illustrates a relation between Co content and angle of Kerr rotation according to an embodiment of the present invention, wherein the Co content is further increased in a composition of the general formula:

$Tb_{0.21}(Fe_{1-y}Co_y)_{0.79}$. In FIG. 3, A shows a result when a light having wave length of 820 nm is used and B shows that for 633 nm.

The angle of Kerr rotation depends primarily on a magnetic moment of a transition metal according to a disclosure of AIP Conf. Proc. Vol. 24(1974) p. 564 by B. E. Argyle et al. Since in an Fe-Co alloy the magnetic moment will be the highest in a vicinity of Co content of 30 atomic %, the angle of Kerr rotation may be the highest in the vicinity of Co content of 30 atomic %. On the contrary, it has been found that according to the example of the present invention, the angle of Kerr rotation becomes the highest at Co content of 50 atomic % based on the total amount of Fe and Co, and gradually becomes smaller by further increasing the Co content. Thus, an amorphous magnetooptical recording medium of Tb-Fe-Co series which contains Co in an amount of 30 atomic % or more exhibits a large angle of Kerr rotation and is capable of reading at a good S/N ratio.

The amorphous magnetooptical recording medium which contains Co in an amount of 70 atomic % or more decreases in angle of Kerr rotation and results in a difficulty in reading at a good S/N ratio. The medium which comprises the composition having Co atoms in an amount of 40 atomic %-60 atomic % is preferable since the angle of Kerr rotation is deviated by only about 6% from the highest value and the amorphous alloy may be easily prepared with a little deviation of the properties.

Figure 4:
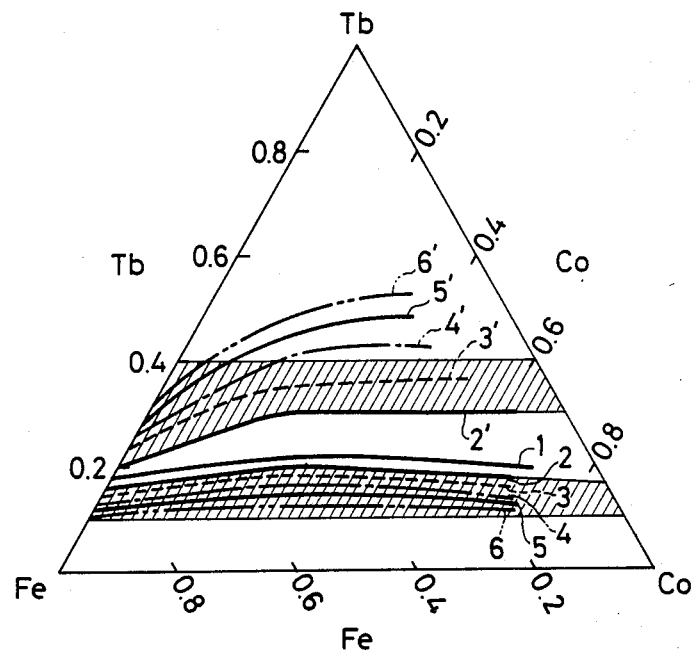
FIG. 4 shows a relation between coercive force and composition of a ternary amorphous magnetic alloy of TbFeCo of the magnetooptical recording medium according to the present invention.

FIG. 4 illustrates a relation between a composition of ternary amorphous magnetic alloy and coercive force thereof in a magnetooptical recording medium according to the present invention. In FIG. 4, line 1 shows the compensation composition, and lines 2 and 2' show compositions having a coercive force of 4,000 oersteds, lines 3 and 3' show 3,000 oe, lines 4 and 4' show 2,000 oe, lines 5 and 5' show 1,000 oe, and lines 6 and 6' show 200 oe.

As seen in FIG. 4, in the vicinity of the line of the compensation composition, the closer the composition to the compensation line, the higher the coercive force. The medium of the composition in the vicinity of the compensation composition line in FIG. 4 is not suitable since a very high magnetic field is required upon magnetizing or demagnetizing, and these media are not suitable with respect to a dispersion of the properties of resulting film and reproducibility during layer formation.

Generally, in order to prepare the electrooptical recording medium which is easy to handle the coercive force is 4,000 oe. or lower. Accordingly, a composition having a suitable coercive force is within the hatched area in FIG. 4, in order to maintain also a sufficient anisotropy.

The hatched area may be represented by the following formula in terms of $Tb_y(Fe_{1-x}Co_x)_{1-y}$.

$$\begin{cases} 0.1 \leq y \leq 0.16 + \frac{4}{37.5} x & \text{when } 0 < x \leq 0.375 \\ 0.1 \leq y \leq 0.2 - 0.064(x - 0.375) & \text{when } 0.375 < x < 1 \end{cases}$$

or $$\begin{cases} 0.2 + \frac{x}{3} \leq y \leq 0.4 & \text{when } 0 < x \leq 0.3 \\ 0.3 \leq y \leq 0.4 & \text{when } 0.3 < x < 1 \end{cases}$$

EXAMPLE 4

In a high frequency sputtering apparatus, a white glass sheet of 25 mm×76 mm in size was used as a substrate, 14 sheets of a Tb thin plate of 10 mm×10 mm in size and 1 mm in thickness and 2 sheets of a Co thin plate of the same size as that of the Tb plate were used on an Fe disc of 127 mm in diameter as a target.

In the apparatus, the substrate and the target were disposed apart at a distance of 90 mm, and the apparatus was evacuated to a pressure of $3 \times 10^{-7}$ Torr or below. Then, Ar gas of 99.999% in purity was introduced into the apparatus at a flow rate of 30 sccm to $6 \times 10^{-3}$ Torr.

A film (Sample No. 1) was formed on the substrate by applying a power of 2 W/cm² to the target from a high frequency power source. It was found that the film thus formed of 1,500 Å in thickness possesses an axis of easy magnetization perpendicular to the film surface, and was amorphous proved by X-ray diffraction.

And it was also found that the film was composed of 13.5 atom % of Tb, 4.7 atom % of Co and balance of Fe, as the result of analysis according to the X-ray microanalyzer (XMA). The film possesses an angle of Kerr rotation of 0.29 degree and coercive force of 1,500 oe.

Similar procedures to those of Sample No. 1 were carried out by changing the number of the target sheet of Tb and Co.

The results are shown in Table 2.

TABLE 2

| Sample No. | Number of target sheet | | Axalysis (atomic %) | | Coercive force (KOe) |
|---|---|---|---|---|---|
| | Tb | Co | Tb | Co | |
| 2 | 13 | 4 | 13.5 | 7.4 | 2.0 |
| 3 | 13 | 6 | 13.5 | 12.0 | 1.6 |
| 4 | 13 | 10 | 13.5 | 19.8 | 1.0 |
| 5 | 13 | 15 | 11.8 | 29.8 | 0.2 |
| 6 | 13 | 30 | 13.4 | 62.4 | 3.2 |
| 7 | 14 | 4 | 16.2 | 7.3 | 3.0 |
| 8 | 14 | 10 | 16.4 | 19.6 | 2.2 |
| 9 | 14 | 15 | 16.1 | 30.2 | 1.9 |
| 10 | 14 | 25 | 16.2 | 51.2 | 3.4 |
| 11 | 15 | 4 | 17.1 | 7.3 | 3.8 |
| 12 | 15 | 15 | 17.0 | 29.9 | 2.5 |
| 13 | 15 | 20 | 17.0 | 39.8 | 2.6 |
| 14 | 15 | 30 | 17.3 | 61.9 | 3.8 |
| 15 | 23 | 2 | 24.5 | 3.4 | 2.2 |
| 16 | 28 | 2 | 30.1 | 3.3 | 1.2 |
| 17 | 28 | 4 | 30.3 | 7.3 | 2.8 |

TABLE 2-continued

| Sample No. | Number of target sheet Tb | Number of target sheet Co | Axalysis (atomic %) Tb | Axalysis (atomic %) Co | Coercive force (KOe) |
|---|---|---|---|---|---|
| 18 | 33 | 3 | 38.6 | 5.6 | 0.4 |
| 19 | 33 | 10 | 39.5 | 18.0 | 2.1 |
| 20 | 33 | 15 | 38.7 | 31.0 | 2.5 |

While the above results were obtained according to a sputtering process, the similar results are obtained by a vacuum deposition process.

The magnetooptical recording medium is composed of a ternary amorphous magnetic alloy according to the present invention, and the S/N ratio in read-out is improved as shown in the foregoing Examples.

What is claimed is:

1. A magnetoopical recording medium comprising a recording layer of an amorphos alloy having an axis of easy magnetization in a direction perpendicular to the film surface, capable of recording information by heating said layer with irradiation of high-thermal energy and reading out said recorded information by magnetooptical effect which comprises a ternary alloy of the formula:

$$Tb_y(Fe_{1-x}Co_x)_{1-y}$$

wherein $$0.01 \leq x \leq 0.7$$

$$0.1 \leq y \leq 0.4$$

and having a curie temperature of at least about 100° C.

2. A magnetooptical recording medium according to claim 1 wherein the ternary amorphous magnetic alloy has a composition represented by the formula:

$$Tby(Fe_{1-x}Co_x)1-y$$

where $$0.1 \leq y \leq 0.16 + \frac{4x}{37.5}$$

when $$0 < x \leq 0.375$$

$$0.1 \leq y \leq 0.2 - 0.064(x - 0.375)$$

when $$0.375 < x < 1.$$

3. A magnetooptical recording medium according to claim 1, wherein the amount of Co atom in the alloy is 1 atomic % or more based on the total amount of Co and Fe atoms.

4. A magnetooptical recording medium according to claim 2, wherein the amount of Co atom in the alloy is 1 atomic % or more based on the total amount of Co and Fe atoms.

5. A magnetooptical recording medium according to claim 1, wherein the amount of Co atom in the alloy is 30 atomic %–70 atomic % based on the total amount of Co and Fe atoms.

6. A magnetooptical recording medium according to claim 2, wherein the amount of Co atom in the alloy is 30 atomic %–70 atomic % based on the total amount of Co and Fe atoms.

7. A magnetooptical recording medium according to claim 5, wherein the amount of Co atom in the alloy is 40 atomic %–60 atomic % based on the total amount of Co and Fe atoms.

8. A magnetooptical recording medium according to claim 6, wherein the amount of Co atom in the alloy is 40 atomic %–60 atomic % based on the total amount of Co and Fe atoms.

9. A magnetooptical recording medium according to claim 1, wherein the film thickness of the ternary amorphous magnetic alloy is 100 Å or more.

10. A magnetooptical recording medium according to claim 2, wherein the film thickness of the ternary amorphous magnetic alloy is 100 Å or more.

11. A magnetooptical recording medium according to claim 1, wherein the ternary amorphous magnetic alloy has a composition represented by the formula:

$$Tby(Fe_{1-x}Co_x)1-y$$

where $$0.2 + \frac{x}{3} \leq y \leq 0.4$$

when $$0 < x \leq 0.3$$

$$0.3 \leq y \leq 0.4$$

when $0.3 < x < 1$.

12. A magnetooptical recording medium according to claim 11, wherein the amount of Co atom in the alloy is 1 atomic % or more based on the amount of Co and Fe atoms.

13. A magnetooptical recording medium according to claim 11, wherein the amount of Co atom in the alloy is 30 atomic %–70 atomic % based on a amount of Co and Fe atoms.

14. A magnetooptical recording medium according to claim 13, wherein the amount of Co atom in the alloy is 40 atomic %–60 atomic % based on the amount of Co and Fe atoms.

15. A magnetooptical recording medium according to claim 11, wherein the film thickness of the ternary amorphous magnetic alloy is 100 Å or more.

* * * * *

UNITED STATES PATENT AND TRADEMARK OFFICE
CERTIFICATE OF CORRECTION

PATENT NO. : 4,670,353

DATED : June 2, 1987

INVENTOR(S) : YOSHIFUMI SAKURAI

It is certified that error appears in the above-identified patent and that said Letters Patent is hereby corrected as shown below:

COLUMN 1

Line 18,    "medium," should read --mediums,--.
    Line 52,    "No," should read --No.--.

COLUMN 2

Line 25,    "larger magnetooptical" should read --larger the magnetooptical--.
    Line 35,    "ferri-" should read --ferro- --.

COLUMN 3

Line 20,    "acc-" should read --ac- --.

COLUMN 5

Line 6,    "sputting" should read --sputtering--.
    Line 22,    "wave length" should read --wavelength--.

COLUMN 6

Line 34,    "99,999%" should read --99.999%--.
    Line 41,    "amorphous proved" should read --proved amorphous--.
    Line 53,    "Axalysis" should read --Analysis--.

COLUMN 7

Line 3,    "Axalysis" should read --Analysis--.
    Line 10,    "the" should be deleted.
    Line 17,    "magnetooapical" should read --magnetooptical--.
    Line 18,    "amorphos" should read --amorphous--.

UNITED STATES PATENT AND TRADEMARK OFFICE
CERTIFICATE OF CORRECTION

PATENT NO. : 4,670,353                   Page 2 of 2

DATED : June 2, 1987

INVENTOR(S) : YOSHIFUMI SAKURAI

It is certified that error appears in the above-identified patent and that said Letters Patent is hereby corrected as shown below:

COLUMN 7

Line 36,   "1 wherein" should read --1, wherein--.
    Line 39,   "Tby" should read --$Tb_y$--.

COLUMN 8

Line 29,   "Tby" should read --$Tb_y$--.
    Line 50,   "a" should read --the--.

Signed and Sealed this

Sixth Day of October, 1987

Attest:

DONALD J. QUIGG

*Attesting Officer*                  *Commissioner of Patents and Trademarks*